(12) United States Patent
Jensen et al.

(10) Patent No.: US 9,873,471 B2
(45) Date of Patent: Jan. 23, 2018

(54) KICKSTAND SYSTEM AND UPGRADE METHOD

(71) Applicant: No Toil Industries, Inc., Yuba, CA (US)

(72) Inventors: Daniel Leroy Jensen, Cameron Park, CA (US); Bradley Allen Jensen, Yuba, CA (US); Robert Allen Jensen, Yuba, CA (US)

( * ) Notice: Subject to any disclaimer, the term of this patent is extended or adjusted under 35 U.S.C. 154(b) by 0 days.

(21) Appl. No.: 14/757,772

(22) Filed: Dec. 23, 2015

(65) Prior Publication Data

US 2016/0176462 A1 Jun. 23, 2016

Related U.S. Application Data

(60) Provisional application No. 62/095,277, filed on Dec. 22, 2014.

(51) Int. Cl.
*B62H 1/02* (2006.01)

(52) U.S. Cl.
CPC ..................... *B62H 1/02* (2013.01)

(58) Field of Classification Search
CPC ........................................................ B62H 1/02
See application file for complete search history.

(56) References Cited

U.S. PATENT DOCUMENTS

| | | | | |
|---|---|---|---|---|
| 2,277,767 A * | 3/1942 | La Brie | ..................... | G05G 7/06 74/142 |
| 2,985,032 A * | 5/1961 | Schroder | ................ | F02M 59/00 74/111 |
| 5,507,200 A * | 4/1996 | Reed | ......................... | B62H 1/02 280/291 |
| 6,170,846 B1 * | 1/2001 | Holter | ...................... | B62H 1/02 280/293 |
| 6,502,844 B1 * | 1/2003 | Winland | ................... | B62H 1/02 280/293 |
| 7,497,291 B1 * | 3/2009 | McKim | ..................... | B62J 25/00 180/90.6 |
| 7,516,973 B2 * | 4/2009 | Mielke | ..................... | B62H 1/02 248/188.8 |
| 7,584,979 B2 * | 9/2009 | Labonte | ................... | B62H 7/00 180/287 |
| 7,621,550 B1 * | 11/2009 | Boruff | ...................... | B62H 1/02 280/293 |
| 7,654,358 B2 * | 2/2010 | Gilgallon | ............... | B62K 23/08 180/230 |
| 8,998,237 B2 * | 4/2015 | Zhu | ......................... | B62K 25/08 180/219 |
| 2016/0031504 A1 * | 2/2016 | Ito | ............................ | B62H 1/02 280/301 |
| 2016/0221623 A1 * | 8/2016 | Kim | ........................ | B62K 19/42 |

* cited by examiner

*Primary Examiner* — Kevin Hurley
*Assistant Examiner* — Gabriela C Craciun

(57) ABSTRACT

A system having a kickstand bracket is described. The kickstand bracket has a leg stop groove and a mount position, the leg stop groove having a boundary and a recess between ends of the boundary. The recess is configured for accepting a leg stop when a kickstand is rotated from a first position to a second position. An alignment locator is configured to attach to the kickstand bracket over the leg stop. A spring is attached at one end on the kickstand and at the other end on the mount position of the kickstand bracket, the spring configured for urging the kickstand towards the second position.

2 Claims, 4 Drawing Sheets

KICKSTAND SYSTEM AND UPGRADE METHOD

CROSS-REFERENCE TO RELATED PATENT APPLICATIONS

This application claims priority from Provisional U.S. Application 62/095,277, filed Dec. 22, 2014, titled "KICKSTAND UPGRADE KIT AND METHOD," which is incorporated herein by reference in its entirety.

BRIEF DESCRIPTION OF THE DRAWINGS

Certain exemplary embodiments are described herein with reference to the following Figures, wherein.

DETAILED DESCRIPTION

Figure 1:
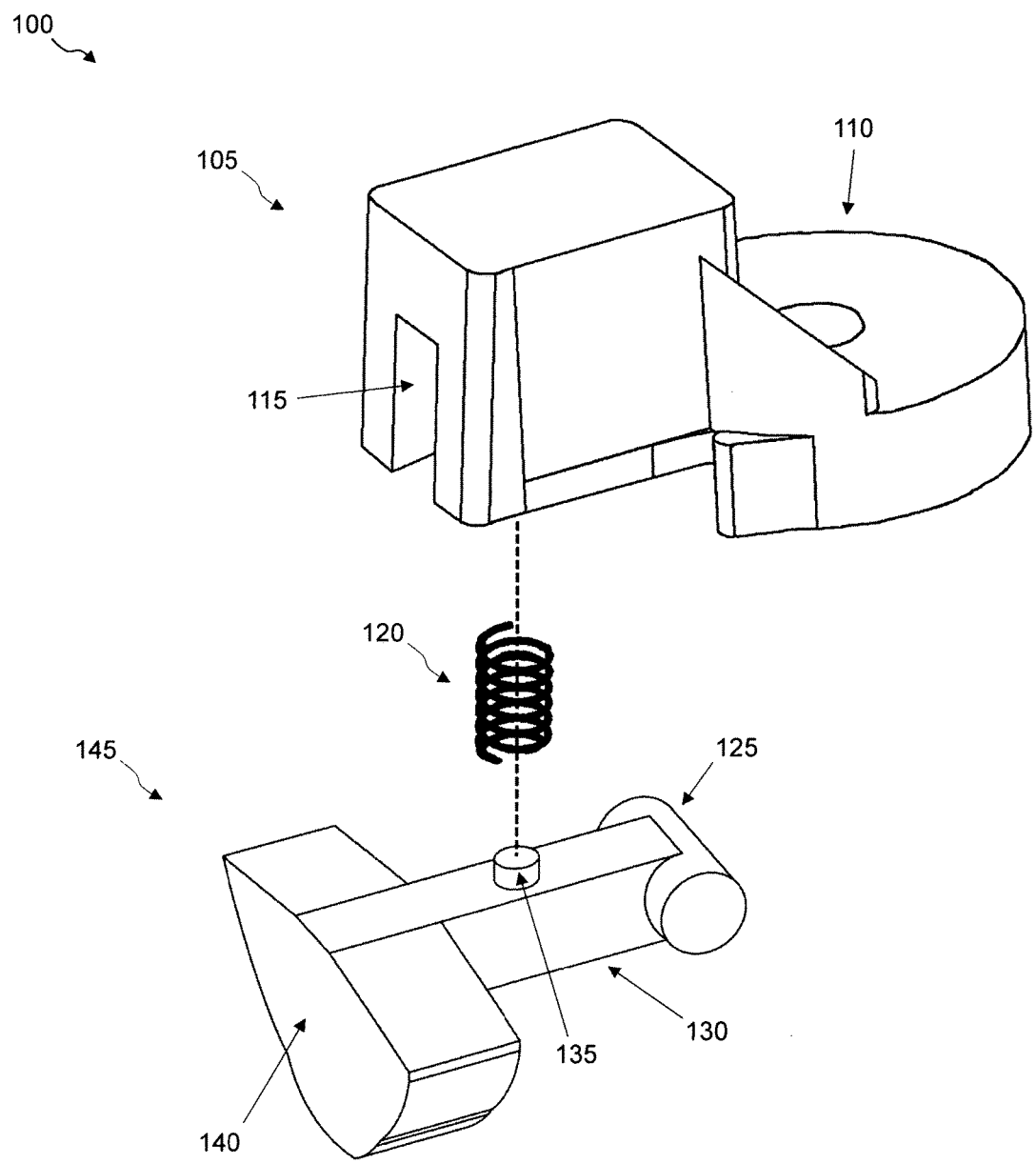
FIG. 1 is a perspective, exploded, view of an exemplary alignment locator.

The detailed description set forth below in connection with the appended drawings is intended as a description of various aspects of certain exemplary embodiments and is not intended to represent the only aspects of those embodiments. Each aspect described in this disclosure is provided merely as an example or illustration, and should not necessarily be construed as preferred or advantageous over other aspects. The detailed description includes specific details for providing an adequate understanding of the present disclosure. However, it will be apparent to those skilled in the art that the present disclosure may be practiced without these specific details. Acronyms and other descriptive terminology may be used merely for convenience and/or clarity and are not intended to limit the scope of the present disclosure. Any steps in a method should not be construed as needing to be carried out, or needing to be carried out in the order listed, unless stated otherwise.

In this detailed description, the term "may" refers to something that is permissible. The term "can" refers to something that is possible. The term "vehicle" includes motorcycles, scooters, bicycles, and any other device of the type that relies on a kickstand to maintain a desired (e.g., upright or nearly upright) orientation.

Embodiments of the present disclosure relate generally to kickstands. Certain exemplary embodiments relate to upgrade kits for motorcycle kickstands, and improved kickstands that can provide aural or visual indication that the kickstand is in a position to be locked in place.

In one exemplary embodiment, an easily-installable kit can be provided that can be applied to upgrade stock kickstands with improved functionality. This functionality can give users of the vehicle more confidence that their kickstand has deployed. This embodiment can include an alignment locator that makes a sound when the kickstand is rotated into a position to be locked into place. It can include a spring relocation bracket to change an attachment point of a spring. It can include a spring that exhibits a force to urge the kickstand into a deployed position. The spring, together with the modified spring attachment point, can exert a sufficient force on the kickstand to improve rotation of the kickstand when it is moved beyond its closed (first) position. These features can help kickstand deployment because users can feel the improved kickstand rotation caused by the spring and hear a sound caused by the alignment locator when the kickstand reaches the open (second) position. This can give the user confidence that their kickstand is in the proper position to support the vehicle when the vehicle is rested against the kickstand.

The kickstand upgrade components of the kit can be applied to any kickstands operably capable of receiving them. In one exemplary embodiment, they are applicable to motorcycle kickstands, and more precisely to Harley Davidson kickstands. However, in alternate embodiments, the components can be adapted to upgrade the kickstands of other vehicles or brands.

In some embodiments, the spring relocation bracket can be integrated into the kickstand bracket, as a unitary body. It might not be necessary to attach a separate component (the spring relocation bracket) if the kickstand bracket mounted to the vehicle already has an appropriate mount position. In some embodiments, the user can receive visual indication that the kickstand is in the second position, in addition to or instead of aural indication from the alignment locator.

Figure 2:
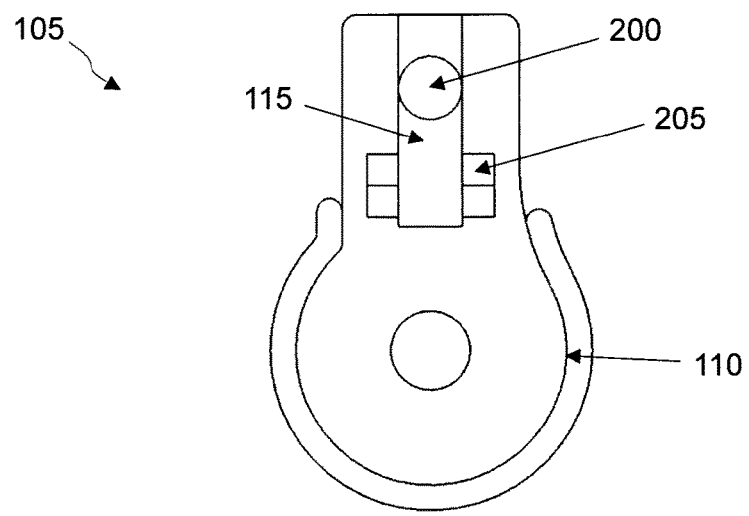
FIG. 2 is a bottom view of an exemplary housing of the alignment locator.

Referring to FIG. 1, a perspective, exploded view of an exemplary alignment locator 100 is shown. The alignment locator 100 can have a housing 105, a first spring 120, and a tooth mechanism 145. Referring to FIG. 2, a bottom view of the housing 105 of the exemplary alignment locator 100 is shown. The housing 105 can have a mounting point 110, a first recess 200 for the first spring 120, a second recess 205 for the tooth mechanism 145, and a channel 115. The tooth mechanism 145 can have a joint 125 configured to operably engage with the second recess 205, an arm 130 extending from the joint 125 to a tooth 140 on the end of the tooth mechanism 145, and a protrusion 135 on the arm 130 for engaging with the first spring 120. The joint 125 can enable rotation of the tooth mechanism 145 and allow the arm 130 to travel up and down, at least partially, through the channel 115 of the housing 105. The first spring 120 can reside in the first recess 200 and be configured to provide an appropriate amount of resistance against the movement of the arm 130 of the tooth mechanism 145 through the channel 115. In some exemplary embodiments, the first spring 120 can be a group of springs of different diameters, located substantially concentrically one within the other.

Figure 3:
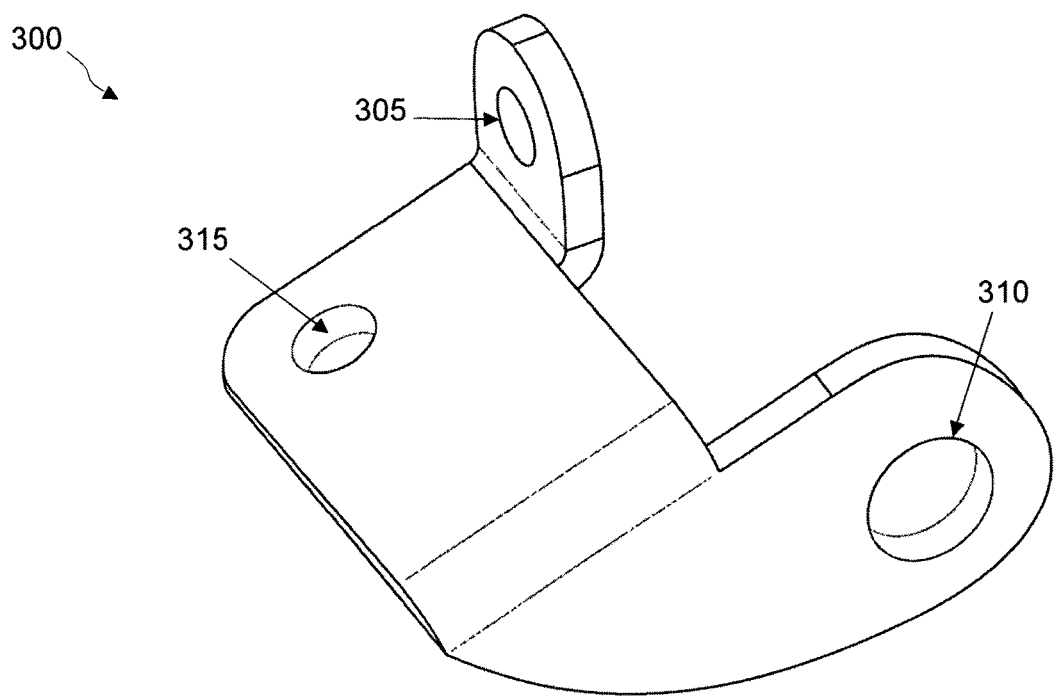
FIG. 3 is a perspective view of an exemplary spring relocation bracket.

Referring to FIG. 3, a perspective view of an exemplary spring relocation bracket 300 is shown. The spring relocation bracket 300 can have a spring attachment point 305, a kickstand mounting hole 310, and a kickstand bracket attachment point 315. The kickstand mounting hole 310 can be used to mount the spring relocation bracket 300 to the vehicle. In certain exemplary embodiments, the same bolt can be used to mount the spring relocation bracket 300 and to mount a kickstand bracket 408 (of FIG. 4) to the vehicle. In this embodiment, the bolt goes through the kickstand mounting hole 310, through an aligned hole 430 (of FIG. 4) in the kickstand bracket 408, and attaches to a point on the vehicle. In other embodiments, the kickstand mounting hole 310 might not be necessary and the only attachment point for the spring relocation bracket 300 could be at the kickstand bracket attachment point 315. The kickstand bracket 408 could still be mounted to the vehicle at the aligned hole 430 on the kickstand bracket 408.

The kickstand bracket attachment point 315 can be a hole, with a corresponding hole 425 (of FIG. 4) on the kickstand bracket 408, such that a bolt or other attachment means can be used to attach the spring relocation bracket 300 to the kickstand bracket 408. In this manner, there can be two points at which the spring relocation bracket 300 can be attached to the kickstand bracket 408—the kickstand mounting hole 310 and the kickstand bracket attachment point 315. The corresponding hole 425 of the kickstand bracket 408 could previously have been the original attachment point for a stock kickstand spring. With the kit, this corresponding hole 425 can be used to attach the spring relocation bracket 300 to the kickstand bracket 408, and the spring relocation bracket 300 can have its own spring attachment point 305.

Figure 4:
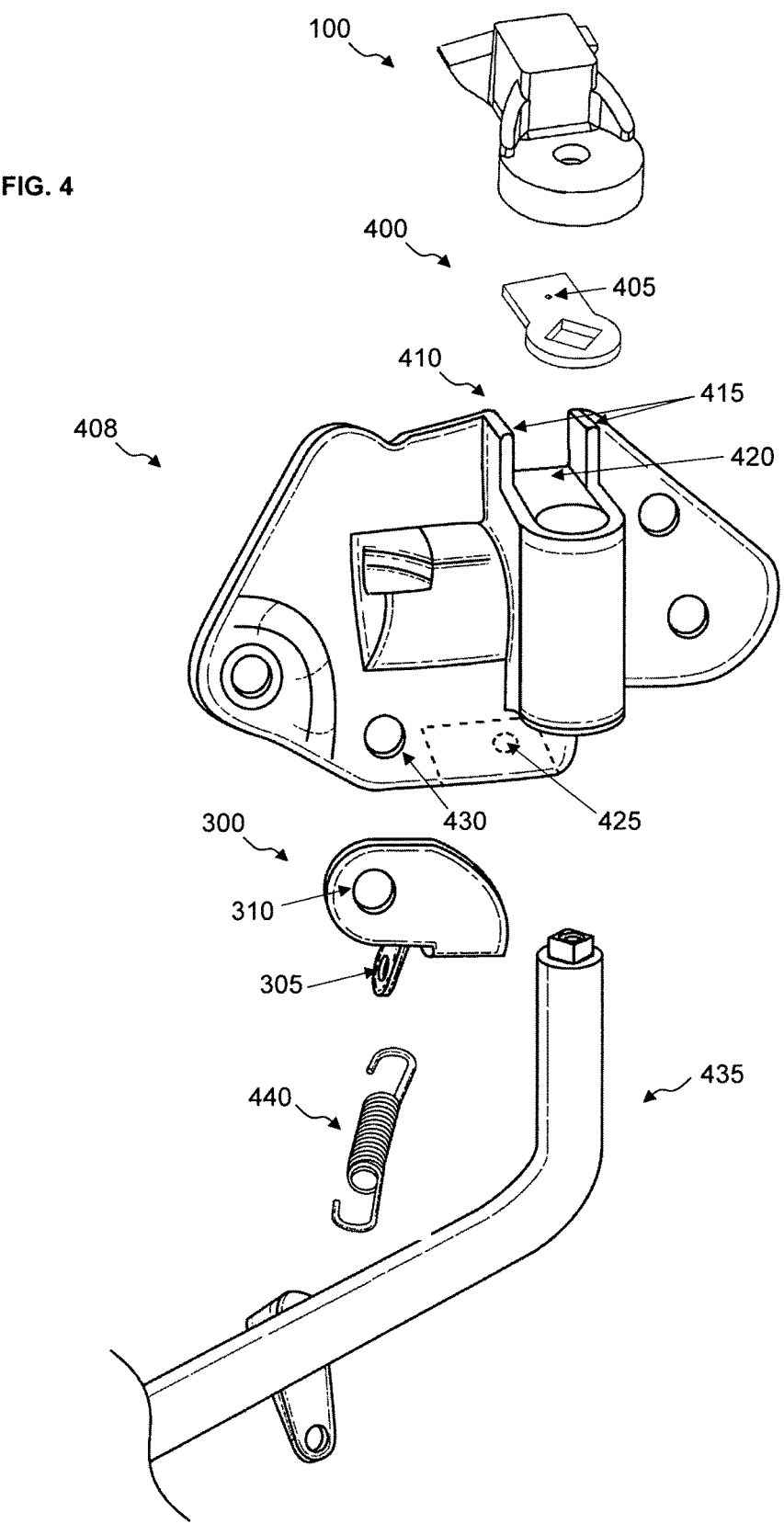
FIG. 4 is a perspective, exploded, view of a kickstand assembly.

The spring attachment point 305 can be a hole for accepting a hook of a second spring 440 (of FIG. 4). This hole can be located farther from the end of a kickstand 435 (of FIG. 4) (when the kickstand 435 is in the closed position) than the corresponding hole 425. The spring attachment point 305 can create more tension in the second spring 440 when the kickstand 435 is in the first (closed) position. This can urge the kickstand 435 towards the second (open) position, especially when the kickstand 435 has already slightly been moved away from the first position. The urging of the second spring 440 can help rotate the kickstand 435 more quickly and in a way that gives the user more confidence that their kickstand 435 has rotated to the second position. Instead of having the second spring 440 be parallel to the kickstand 435 when the kickstand 435 is in the second position (which might make it easy for the kickstand 435 to collapse back to the first position since there would be little tension on the kickstand 435), the second spring 440 can be attached at the spring attachment point 305. This positioning can allow the second spring 440 to apply force on the kickstand 435 even when the kickstand 435 is in the second position, thereby making it more difficult for the kickstand 435 to collapse into the first position.

In certain exemplary embodiments, the spring relocation bracket 300 and alignment locator 100 can be added to a stock kickstand assembly as follows. A leg stop 400 (of FIG. 4) can be removed from the kickstand bracket 408. This can include removing a bolt which fastens down the leg stop 400. Once the leg stop 400 is removed, the kickstand 435 can be removed, if for example, the bolt holding down the leg stop 400 was threaded into the kickstand 435. The kickstand 435 can be rotated forward to release the tension in the stock spring. Alternatively, in some embodiments, this may be performed before the leg stop 400 is removed. Once the tension in the stock spring is released, the stock spring can be removed. When the leg stop 400 is removed, the kickstand 435 can also be removed from the kickstand bracket 408. The bolts holding the kickstand bracket 408 to a frame of the vehicle can be removed to detach the kickstand bracket 408 from the frame. In some embodiments, removing the kickstand bracket 408 from the frame might not be necessary if the spring relocation bracket 300 can be attached to the kickstand bracket 408 without removal of the kickstand bracket 408.

In certain exemplary embodiments, the spring relocation bracket 300 can be attached to the kickstand bracket 408. In certain exemplary embodiments, a bolt can be used to fasten the spring relocation bracket 300 at the kickstand bracket attachment point 315, to the corresponding hole 425 on the kickstand bracket 408 where the stock spring used to attach. Thread lock fluid may be applied to any threaded connections to prevent the bolts from vibrating loose.

In certain exemplary embodiments, when the spring relocation bracket 300 has been attached to the kickstand bracket 408, the kickstand bracket 408 can be fastened back onto the frame. In certain exemplary embodiments, a bolt can go through the kickstand mounting hole 310 on the spring relocation bracket 300, through an aligned hole 430 in the kickstand bracket 408, and then attach to a point on the vehicle. Thread lock fluid may be applied to any threaded connections to prevent the bolts from vibrating loose. In other embodiments, the spring relocation bracket 300 might not have a kickstand mounting hole 310, but could still be attached to the kickstand bracket 408 at the kickstand bracket attachment point 315.

In certain exemplary embodiments, the kickstand 435 can be placed back into the kickstand bracket 408, the kickstand bracket 408 having a shaft for accepting the kickstand 435 and allowing its rotational operation within the kickstand bracket 408. Instead of the stock spring, a second spring 440 can be operably coupled between the kickstand 435 and the spring relocation bracket 300. In certain exemplary embodiments, the second spring 440 can be a high tension spring configured for urging the kickstand 435 towards the second position. The second spring 440 can also have sufficient tension to prevent the kickstand 435 from easily reverting to the first position, for example without help of an external force applied by the user. The corresponding hole 425 does not, in many cases, create enough tension in the stock spring to give the user confidence that their kickstand 435 has rotated to the second position. The second spring 440 and the spring relocation bracket 300 can overcome this problem. The kickstand 435 may need to be rotated forward (closer to the spring relocation bracket 300) so that the second spring 440 can be operably coupled between the kickstand 435 and the spring attachment point 305 of the spring relocation bracket 300. In certain exemplary embodiments, the hooks of the second spring 440 can face forward (e.g. towards the front of the vehicle when the kickstand 435 is in the second position, or away from the vehicle when the kickstand 435 is in the first position) when the second spring 440 is attached to the vehicle.

In certain exemplary embodiments, the leg stop 400 can be replaced at its original location. In some embodiments, the leg stop 400 can be replaced before the second spring 440 is attached. In certain exemplary embodiments, there is a dimple 405 (of FIG. 4) on the top side of the leg stop 400. The leg stop 400 can be replaced with the dimple 405 facing up, thereby properly orienting the leg stop 400 in the kickstand bracket 408. Once the leg stop 400 has been positioned, the alignment locator 100 can be placed over it. Mounting point 110 of housing 105 can be designed to fit snuggly around the leg stop 400, and the leg stop 400 can be sufficiently long to prevent the tooth mechanism 145 and the first spring 120 from falling out of the housing 105. Both the alignment locator 100 and the leg stop 400 can then be fastened down with the bolt previously used to fasten down the leg stop 400. Thread lock fluid may be applied to prevent the bolt from vibrating loose.

Referring to FIG. 4, a perspective, exploded, view of a kickstand assembly is shown. The kickstand assembly can comprise the kickstand bracket 408, the kickstand 435, the leg stop 400, the spring relocation bracket 300, the alignment locator 100, and the second spring 440. In some embodiments, the spring relocation bracket 300 might not be needed if the spring attachment point 305 (or another suitable mount position) is already part of the kickstand bracket 408, as a unitary body. The kickstand bracket 408 can have holes to allow it to be mounted to the frame of the vehicle. The kickstand bracket 408 can also have a leg stop groove 410 with a boundary 415 and a third recess 420 between ends of the boundary 415. The third recess 420 can be configured for accepting the leg stop 400 when the kickstand 435 is rotated into the second position and the vehicle is leaned onto the kickstand 435. When the leg stop 400 enters the third recess 420, the kickstand 435 can be prevented, by the boundary 415 of the leg stop groove 410, from rotating out of the second position.

Figure 5:
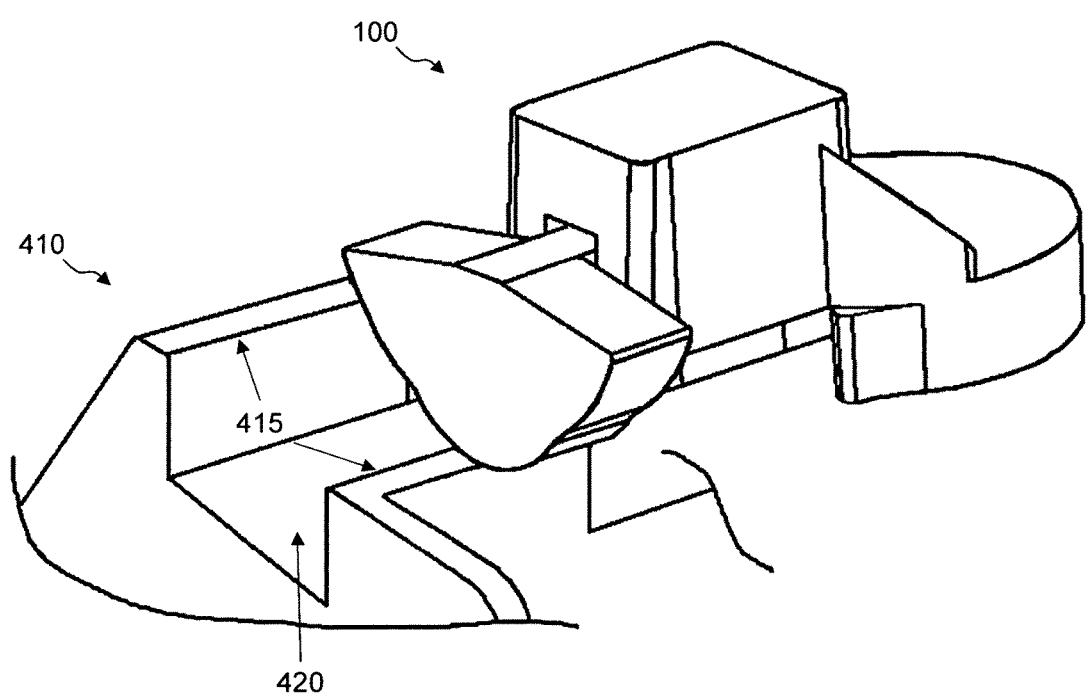
FIG. 5 is a perspective view of an exemplary rotation of a kickstand, wherein a tooth encounters and begins overcoming a boundary of a leg stop groove.

Referring to FIG. 5, a perspective view of an exemplary rotation of the kickstand 435 is shown, wherein the tooth 140 encounters and begins overcoming the boundary 415 of the leg stop groove 410. In operation, the first spring 120 can act to keep the tooth mechanism 145 down when the kickstand 435 is in either the first or the second position. However, as the kickstand 435 moves from the first position to the second position (overcoming the force of the first spring 120), a slanted edge of the tooth 140 can provide a way for the tooth mechanism 145 to travel slightly upwards as the tooth mechanism 145 traverses the boundary 415 of the leg stop groove 410. The slanted edge can help the tooth mechanism 145 glide up over the boundary 415. Once it has passed the boundary 415, the first spring 120 can cause the tooth mechanism 145 to snap back down into the third recess 420. In certain exemplary embodiments, the user of the kickstand 435 receives aural indication, for example by way of a snapping sound caused by the first spring 120 bringing the tooth mechanism 145 back down, that the kickstand 435 has been rotated to the second position. This can give the user confidence that they may now rest their vehicle on the kickstand 435 without worry of the kickstand 435 being disengaged. The second spring 440 can assist the kickstand 435 to move into the second position when the user initiates rotation of the kickstand 435. The second spring 440 can also help to prevent the kickstand 435 from reverting to the first position when in the second position, for example if the vehicle has not yet been leaned down to engage the leg stop in the third recess 420 of the leg stop groove 410.

Although bolts are mentioned in this detailed description, other attachment means may be used as well. As a non-limiting example, welding may be used.

Other features of the present disclosure will become apparent as the description proceeds, especially when taken in conjunction with the accompanying drawing sheets illustrating certain exemplary embodiments of the disclosure.

What is claimed is:

1. A system comprising:
a spring relocation bracket configured to attach to a kickstand bracket having a leg stop groove, the leg stop groove having a boundary and a recess between ends of the boundary, the recess configured for accepting a leg stop when a kickstand is rotated from a first position to a second position, wherein the leg stop is operably coupled with the kickstand and the kickstand is rotatably engaged with the kickstand bracket;
an alignment locator configured to attach to the kickstand bracket over the leg stop, the alignment locator comprising a tooth and a first spring, the first spring configured to resist upward motion of the tooth, such that when the kickstand is rotated from the first position, the tooth travels over the boundary and into the recess of the leg stop groove, thereby aligning the leg stop with the leg stop groove and enabling the kickstand to be locked into place in the second position; and
a second spring coupled to the kickstand and the spring relocation bracket for urging the kickstand towards the second position.

2. The system of claim 1, wherein the alignment locator emits a sound when the kickstand is rotated to the second position.

* * * * *